US012255420B2

(12) United States Patent
Griepenstroh

(10) Patent No.: US 12,255,420 B2
(45) Date of Patent: Mar. 18, 2025

(54) SELF-LOCKING CLIP

(71) Applicant: HARTING ELECTRIC STIFTUNG & CO. KG, Espelkamp (DE)

(72) Inventor: Sebastian Griepenstroh, Lübbecke (DE)

(73) Assignee: Harting Electric Stiftung & Co. KG, Espelkamp (DE)

( * ) Notice: Subject to any disclaimer, the term of this patent is extended or adjusted under 35 U.S.C. 154(b) by 28 days.

(21) Appl. No.: 17/908,872

(22) PCT Filed: Feb. 23, 2021

(86) PCT No.: PCT/DE2021/100175
§ 371 (c)(1),
(2) Date: Sep. 1, 2022

(87) PCT Pub. No.: WO2021/175365
PCT Pub. Date: Sep. 10, 2021

(65) Prior Publication Data

US 2024/0204456 A1 Jun. 20, 2024

(30) Foreign Application Priority Data

Mar. 3, 2020 (DE) ..................... 10 2020 105 589.7

(51) Int. Cl.
*H01R 13/629* (2006.01)

(52) U.S. Cl.
CPC .............................. *H01R 13/62933* (2013.01)

(58) Field of Classification Search
CPC .... H01R 13/629; H01R 13/639; H01R 24/00; H01R 13/62955
See application file for complete search history.

(56) References Cited

U.S. PATENT DOCUMENTS 7,717,723 B2 * 5/2010 Nehm .............. H01R 13/62966 439/372
8,403,697 B2 * 3/2013 Fukamachi ...... H01R 13/62938 439/372

(Continued)

FOREIGN PATENT DOCUMENTS

CN 102 709 747 B 8/2015
DE 2915574 A1 10/1980

(Continued)

OTHER PUBLICATIONS

International Preliminary Report on Patentability, mailed Sep. 6, 2022, for International Application No. PCT/DE2021/100175, 7 pages.

(Continued)

*Primary Examiner* — Tulsidas C Patel
*Assistant Examiner* — Carlos E Lopez-Pagan
(74) *Attorney, Agent, or Firm* — Seed IP Law Group LLP

(57) ABSTRACT

A locking clip for reversibly locking an attachment housing with a plug connector housing is provided, wherein the locking clip has a rear wall and lateral parts, which are integrally formed thereon, and has a U-shaped cross section, wherein the lateral parts each have a bearing receptacle by way of which the locking clip is able to be pivotably mounted on the attachment housing, and wherein the lateral parts each have an arresting receptacle which can be gripped by way of an arresting pin of the plug connector housing, wherein the arresting receptacles each have a V-shaped groove.

9 Claims, 2 Drawing Sheets

(56) References Cited

U.S. PATENT DOCUMENTS

| | | | |
|---|---|---|---|
| 8,979,568 B2 * | 3/2015 | Herbrechtsmeier ......................... H01R 13/62966 439/346 |
| 10,601,178 B2 * | 3/2020 | Spilker .................. H01R 43/26 |
| 2009/0311893 A1 * | 12/2009 | Sugiyama ........ H01R 13/62938 439/157 |
| 2012/0115346 A1 * | 5/2012 | Zwanger ............ H01R 13/6599 439/310 |
| 2012/0315782 A1 | 12/2012 | Herberchtsmeier et al. |
| 2014/0113476 A1 | 4/2014 | Shimizu et al. |

FOREIGN PATENT DOCUMENTS

| | | |
|---|---|---|
| DE | 10 2004 061 046 B4 | 2/2007 |
| DE | 20 2010 002 396 U1 | 5/2010 |
| DE | 11 2012 002 791 T5 | 3/2014 |
| JP | 2004111115 A | 4/2004 |

OTHER PUBLICATIONS

International Search Report and Written Opinion, mailed Apr. 26, 2021, for International Patent Application No. PCT/DE2021/100175. (11 pages) (with English translation of International Search Report).

Office Action, dated Oct. 28, 2020, for German Patent Application No. 10 2020 105 589.7 (6 pages).

* cited by examiner

SELF-LOCKING CLIP

BACKGROUND

Technical Field

The disclosure is based on a locking clip for reversibly locking an attachment housing to a plug-connector housing. The disclosure also relates to a system made of up an attachment housing having such a locking clip and of an appropriate plug connector.

Such locking clips are used for reversibly locking two fitted-together plug connectors or plug-connector housings. One of these plug-connector housings can also be a so-called attachment housing. An attachment housing provided with contacts is also referred to as an attachment flange.

Description of the Related Art

DE 29 15 574 A1 discloses a locking clip for reversibly locking a first plug-connector housing to a second plug-connector housing. The locking clip is made from a resiliently elastic wire.

DE 10 2004 061 046 B4 discloses a locking clip which has been punched out of a piece of sheet metal and provides for resilient locking between two plug-connector housings.

The two locking clips mentioned above are mounted in a pivotable manner on a housing of a plug connector. The locking clips have an arresting mount, and each of these engage over a locking pin of a second plug-connector housing, as a result of which the first plug-connector housing and the second plug-connector housing are pressed against one another in a resilient manner. The two plug-connector housings are then in a state in which they are locked to one another. During the locking operation, the plug-connector housings and the locking pins are subjected to a pronounced amount of wear since, during the pivoting operation, the locking clips rub against the plug-connector housings and, in particular, against the bearing pins thereof. The reliability of the locking action therefore decreases after a certain number of locking cycles.

In many cases, plug-fit connections are fitted together without use being made of the locking clips provided for reversibly locking the plug-fit connection. As a result, it is easily possible for the plug-fit connections to be unintentionally released. In particular in the case of power being supplied to rechargeable batteries, this can be associated with high levels of risk.

In the priority application relating to the present application, the German Patent and Trademark Office has searched the following prior art: DE 20 2010 002 396 U1, JP 2004-111115 A, U.S. Pat. No. 8,403,697 B2, DE 11 2012 002 791 T5 and US 2009/0 311 893 A1.

BRIEF SUMMARY

Embodiments of the invention provide a locking clip which is easy to operate and, at the same time, reliable.

The locking clip according to the invention is provided for locking two fitted-together plug-connector housings or an attachment housing to a plug-connector housing. The locking clip is made up essentially of a rear wall and side parts, which are formed on the rear wall, wherein the locking clip has a U-shaped cross section. The side parts each have a bearing mount. The bearing mount is usually configured in the form of a circular opening. The bearing mount engages over an appropriate bearing pin of a plug-connector housing or attachment housing. The bearing mount allows the locking clip to be mounted in a pivotable manner on the plug-connector housing. The side parts of the locking clip each have an arresting mount, which engage over an arresting pin of the mating plug-connector housing, as a result of which (in this state) the attachment housing and the mating plug-connector are reversibly locked to one another.

According to an embodiment of the invention, the arresting mounts each have a V-shaped groove. As a result of the V-shaped groove, when the arresting pin is being inserted into the arresting mounts, the locking clip is guided automatically, i.e., without being actuated by a person, into its locking end position. This takes place mechanically. The kinetic energy of the plug-fit operation is utilized here.

In a particularly advantageous configuration of the invention, the arresting pins of the plug-connector housing have a cylindrical basic shape with a contour formed thereon. The contour is formed such that it engages in a precisely fitting manner in the V-shaped groove of the locking clip, carries the latter along during the plug-fit operation and, as a result, the arresting mounts are fully guided via the arresting pins such that an end position or locking position of the locking clip is reached and locking of the plug-fit connection is ensured. There is no need for the locking clip to be activated. This automatic locking of the locking clip therefore also means that the locking of the plug-fit connection cannot accidentally be forgotten about.

The locking clip is made up of a rear wall with side parts formed therein. The locking clip has a U-shaped cross section. The side parts have bearing mounts, via which the locking clip is mounted in a pivotable manner on an attachment housing. The side parts have arresting mounts, which can engage over arresting pins on a plug-connector housing.

The locking clip is preferably made in the form of a one-piece component. The locking clip is advantageously made from an elastic material and can be produced, for example, by a punching/bending process. The locking clip preferably consists of plastic material. In the case where the locking clip is produced from plastic material, it is recommended for it to be injection molded. Such production methods are particularly cost-effective.

The locking clip is usually used in a system made up of an attachment housing and of a plug connector or mating plug connector. The locking clip here is fastened in a pivotable manner on the attachment housing via bearing pins. In a pivoting operation, the locking clip can pivot via, and be fastened on, arresting pins, which are formed on the plug-connector housing. It is thus possible for the attachment housing and the plug-connector housing to be reversibly locked to one another.

A particularly advantageous aspect of embodiments of the invention is that the locking clip transfers automatically into the arresting position when the plug-connector housing is brought together with the attachment housing or when a plug connector is fitted into the attachment flange.

The attachment housing and the plug-connector housing may advantageously consist of plastic material. Such housings can be produced very cost-effectively.

The abovementioned bearing pins and/or the arresting pins preferably have a cylindrical basic shape. A contour is formed on the plug-connector housing, and this contour engages in the V-shaped groove of the arresting mount of the locking clip. Such a contour can very easily be incorporated in the production process of the locking clip, such as in an injection-molding process. This means that the production process is not beset by any additional outlay or any additional costs.

The bearing pins and the arresting pins and the contours possibly formed thereon may project, perpendicularly, along their axis of symmetry, from the respective plug-connector housing. The bearing pins and the arresting pins here are each longer than the respective contours.

BRIEF DESCRIPTION OF THE SEVERAL VIEWS OF THE DRAWINGS

Embodiments of the invention will be explained in more detail hereinbelow and is illustrated in the drawings, in which.

The figures may contain partially simplified, schematic illustrations. In some cases, identical reference signs are used for elements which are alike, but possibly not identical. Different views of like elements could be scaled differently.

DETAILED DESCRIPTION

Direction-related information such as, for example, "left," "right," "top" and "bottom" are to be understood in relation to the respective figure and can vary in the individual illustrations with respect to the object illustrated.

Figure 1:
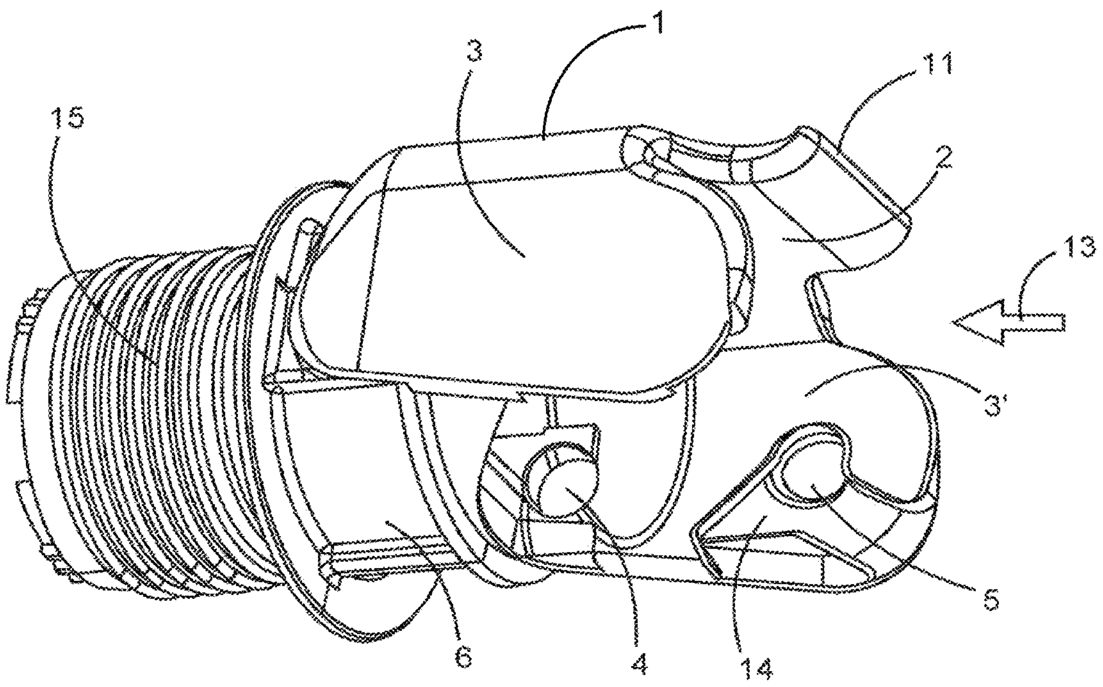
FIG. 1 shows a perspective illustration of the attachment flange having a locking clip according to an embodiment of the invention fastened in a pivotable manner thereon.

FIG. 1 shows a perspective illustration of an attachment housing 6, on which a locking clip 1 according to an embodiment of the invention is mounted in a pivotable manner. On the attachment side, the attachment housing 6 has an external thread 15, by way of which it can be fixed to a piece of equipment (not shown) or the wall 16 (FIG. 3) thereof.

The locking clip 1 is made up of a rear wall 2 and two side parts 3, 3', which are formed on the rear wall 2. The locking clip 1 has an essentially U-shaped cross section. An opening is made in the lower region of each of the side parts 3, 3', and these openings each serve as a bearing mount 4, 4'. In the upper region, the side parts 3, 3' each have a cutout, which functions as an arresting mount 5, 5'. The rear wall 2 has formed on it, in the upper region, an actuating means or device 11, which is bent back from the rear wall 2. This actuating means or device 11 can be used by a user to apply force during the pivoting operation, in particular for the purpose of releasing the locking.

Figure 2:
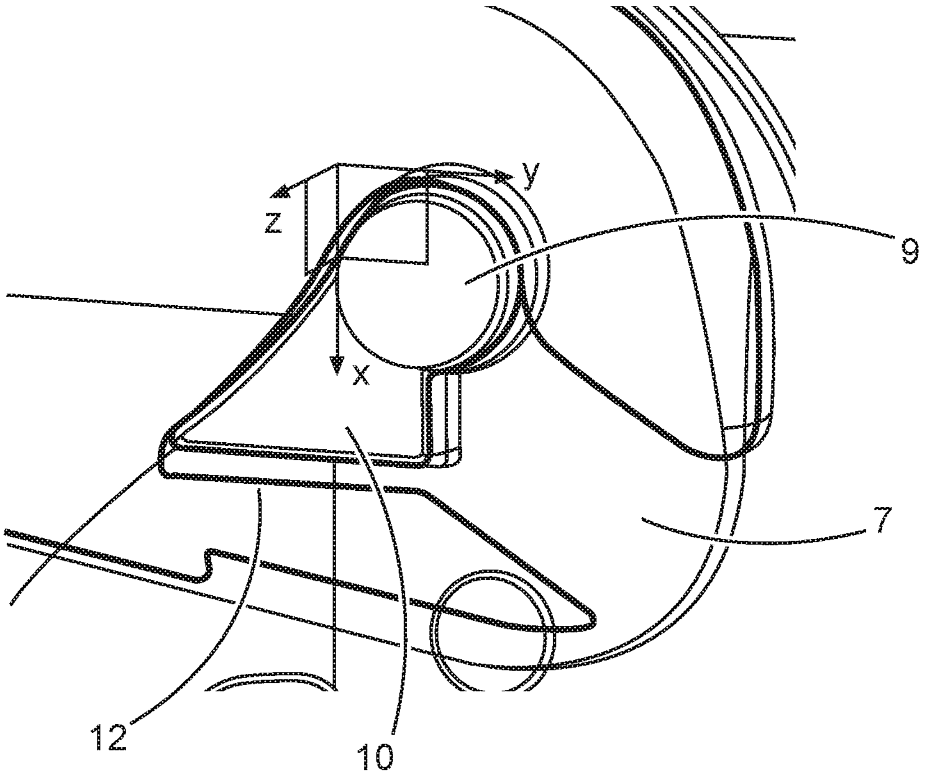
FIG. 2 shows a detail of a plug connector in the region of its arresting mounts.

In FIG. 2, the arresting region of the plug-connector housing 7 is illustrated on an enlarged scale. The boundary contour 12 of the arresting region of the locking clip 1 is depicted in FIG. 2, in order to show clearly the end position of the locking state. The bearing mounts 4, 4' of the locking clip 1 engage over bearing pins 8 of the attachment housing 6. As a result, the locking clip 1 is mounted in a pivotable manner on the attachment housing 6. Arresting pins 9 are formed on the narrow sides of the plug-connector housing 7. In the locked state, the arresting mounts 5 of the locking clip 1 engage over the arresting pins 9 of the plug-connector housing 7. As a result, the attachment housing 6 and the plug-connector housing 7 are reversibly locked to one another.

A contour 10 is formed on the arresting pins 9 of the plug-connector housing 7. The contour 10 has an essentially triangular cross section, wherein the region of the contour 10, which is formed on the arresting pin 9, has a corresponding circular cutout. The arresting pins 9 are designed to be longer than the contour 10. This means that the arresting pins 9 project perpendicularly to a greater extent from the plug-connector housing 7 than does the respective contour 10.

Figure 3:
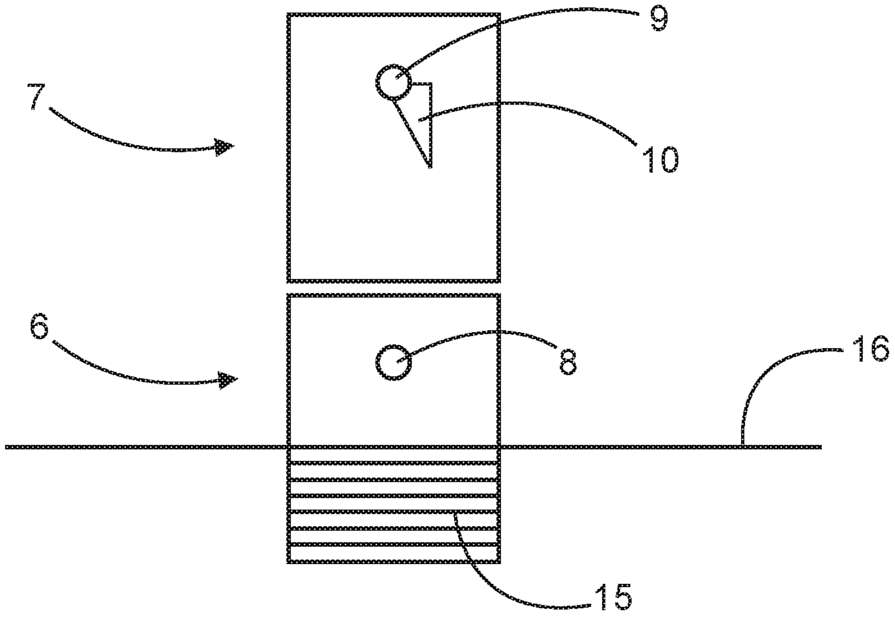
FIG. 3 shows a schematic illustration of an attachment housing and of a plug connector fitted thereto.

FIG. 3 illustrates schematically the attachment housing 6, which has been screwed into a wall 16 of the piece of equipment, and a plug-connector housing 7, which has been fitted to the attachment housing 6. For illustrative reasons, the locking clip 1 is not shown.

The basic position of the locking clip 1 in a non-fitted state is illustrated approximately as is the case in FIG. 1. The plug-connector housing 7 is guided in the direction of the arrow 13 shown in FIG. 1 in relation to the attachment housing 6. The contour 10 here, which is formed on the arresting pins 9, engages in the V-shaped groove 14 of the associated arresting mount 5 of the locking clip 1. During this plug-fit operation, the arresting mount 5 is automatically guided via the arresting pins 9 of the plug connector 1, as a result of which the plug-connector housing 7 is fixed on the attachment housing 6. Via the actuating means or device 11, the arresting pins 9 can be moved away again from the access region of the arresting mounts 5, so that the plug-connector housing 7 can be released again from the attachment housing 6. Accordingly, the actuating means or device 11 is used only when the plug-fit connection is being released.

In the case of the locking clip 1 according to embodiment of the invention, the side parts 3, 3' can have an amount of play in the region between the arresting mount 5, 5' and the associated arresting pins 9, so that, in the locked state, the arresting mount 5, 5' does not rub over the surface of the arresting pins 9.

Even if different aspects or features of embodiments of the invention are shown in combination in each case in the figures, it is clear to a person skilled in the art that—unless stated otherwise—the combinations illustrated and discussed are not the only ones possible. In particular, mutually corresponding units or complexes of features from different exemplary embodiments can be interchanged. In other words, aspects of the various embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A locking clip for reversibly locking an attachment housing to a plug-connector housing, the locking clip comprising:

a rear wall; and side parts, which are formed integrally with the rear wall, wherein the locking clip has a U-shaped cross section, wherein the side parts each have a respective bearing mount by way of which the locking clip can be mounted in a pivotable manner on the attachment housing, wherein the side parts each have a respective arresting mount, which can be engaged in each case over a respective arresting pin of the plug-connector housing, wherein each of the arresting mounts is proximal to a respective V-shaped groove, wherein an apex of each V-shaped groove is spaced apart from the arresting mount, and wherein each V-shaped groove is defined by a respective set of walls of the locking clip that are offset from an outer perimeter of the locking clip.

2. The locking clip according to claim 1, wherein the locking clip consists of plastic material.

3. The locking clip according to claim 1, wherein the locking clip is made in one piece.

4. A system comprising: an attachment housing; a locking clip of claim 1; and a plug-connector housing.

5. The system according to claim 4, wherein the plug-connector housing has arresting pins with a respective contour extending from each arresting pin.

6. The system according to claim 5, wherein each of the arresting pins has a cylindrical shape, and the respective contour extends from a side of the cylindrical shape.

7. The system according to claim 5, wherein each respective contour has a triangular cross section with an at least partially circular cutout.

8. The system according to claim 5, wherein the respective contour extending from each of the arresting pins is configured to fit in the respective V-shaped groove of the locking clip.

9. The system according to claim 5, wherein:

the arresting pins and the contours extending therefrom project perpendicularly from the plug-connector housing, relative to an axis of symmetry of the plug-connector housing; and the arresting pins protrude beyond the associated contours.

* * * * *